(12) United States Patent
Sun et al.

(10) Patent No.: US 11,755,691 B2
(45) Date of Patent: Sep. 12, 2023

(54) DATA PROTECTION METHOD AND APPARATUS, AND SERVER AND MEDIUM

(71) Applicants: Beijing Bytedance Network Technology Co., Ltd., Beijing (CN); ByteDance Inc., Los Angeles, CA (US)

(72) Inventors: Jiankai Sun, Los Angeles, CA (US); Weihao Gao, Beijing (CN); Hongyi Zhang, Los Angeles, CA (US); Chong Wang, Los Angeles, CA (US); Junyuan Xie, Beijing (CN); Liangchao Wu, Beijing (CN); Xiaobing Liu, Los Angeles, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/816,250

(22) Filed: Jul. 29, 2022

(65) Prior Publication Data

US 2022/0383054 A1 Dec. 1, 2022

Related U.S. Application Data (63) Continuation of application No. PCT/CN2021/102488, filed on Jun. 25, 2021.

(30) Foreign Application Priority Data

Jul. 6, 2020 (CN) .......................... 202010640985.X (51) Int. Cl.
*H04L 29/06* (2006.01)
*G06F 18/2415* (2023.01)
(Continued)

(52) U.S. Cl.
CPC ...... *G06F 18/2415* (2023.01); *G06F 18/2193* (2023.01); *G06F 21/62* (2013.01)

(58) Field of Classification Search
CPC .................................................. G06K 9/6277
See application file for complete search history.

(56) References Cited

U.S. PATENT DOCUMENTS 6,680,735 B1 1/2004 Seiler et al.
2017/0372201 A1* 12/2017 Gupta ................. G06N 3/0454
(Continued)

FOREIGN PATENT DOCUMENTS

CN 108416370 A 8/2018
CN 109165515 A 1/2019
(Continued)

OTHER PUBLICATIONS

International Search Report for Internation Patent Application No. PCT/CN2021/102488, dated Aug. 27, 2021 (5 pages).
(Continued)

*Primary Examiner* — Jason K Gee
(74) *Attorney, Agent, or Firm* — ARENTFOX SCHIFF LLP (57) ABSTRACT

Disclosed are a data protection method and apparatus, and a server and a medium. A particular embodiment of the method comprises: acquiring gradient associated information, which respectively corresponds to a target sample that belongs to a binary classification sample set with unbalanced distribution and a reference sample that belongs to the same batch as the target sample; generating information of data noise to be added; according to the information of said data noise, correcting an initial gradient transfer value corresponding to the target sample, such that corrected gradient transfer information corresponding to samples in the sample set that belong to different types is consistent; and sending
(Continued)

the gradient transfer information to a passive party of a joint training model. By means of the embodiment, there is no significant difference between corrected gradient transfer information corresponding to positive and negative samples, thereby effectively protecting the security of data.

20 Claims, 6 Drawing Sheets

(51) Int. Cl.
  *G06F 21/62* (2013.01)
  *G06F 18/21* (2023.01)

(56) References Cited

U.S. PATENT DOCUMENTS

| | | | |
|---|---|---|---|
| 2019/0042763 A1* | 2/2019 | Zhao | G06F 21/60 |
| 2019/0227980 A1 | 7/2019 | McMahan et al. | |
| 2020/0285916 A1* | 9/2020 | Wang | G06N 3/084 |

FOREIGN PATENT DOCUMENTS

| | | |
|---|---|---|
| CN | 109684855 A | 4/2019 |
| CN | 109919299 A | 6/2019 |
| CN | 110443063 A | 11/2019 |
| CN | 110728375 A | 1/2020 |
| CN | 110797124 A | 2/2020 |
| CN | 111008709 A | 4/2020 |
| CN | 111260061 A | 6/2020 |
| CN | 111783142 A | 10/2020 |
| WO | 2022007651 A1 | 1/2022 |

OTHER PUBLICATIONS

Office Action for Chinese Patent Application No. 202010640985.X, dated Jun. 6, 2021 (7 pages).

Notification of Patent Registration for Chinese Patent Application No. 202010640985.X, dated Aug. 23, 2021 (4 pages).

* cited by examiner

DATA PROTECTION METHOD AND APPARATUS, AND SERVER AND MEDIUM

CROSS REFERENCE TO RELATED APPLICATIONS

The present application is a continuation of PCT application Ser. No. PCT/CN2021/102488, titled "DATA PROTECTION METHOD AND APPARATUS, AND SERVER AND MEDIUM", filed on Jun. 25, 2021, which claims the priority of Chinese patent application 202010640985.X that is filed on Jul. 6, 2020 and entitled "DATA PROTECTION METHOD AND APPARATUS, AND SERVER AND MEDIUM", and all the contents of both of which are incorporated herein by reference.

FIELD

Embodiments of the present application relate to the technical field of computers, in particular to a data protection method and apparatus, a server and a medium.

BACKGROUND

With the development of artificial intelligence technology, machine learning is applied more and more widely. In recent years, in order to protect data security and solve the problem of data islands, a related method generally adopts a joint training model to complete joint training of a machine learning model on the premise of not exposing original data. For a supervised machine learning model, a party with a sample label is generally referred to as an active party, and a party without a sample label is referred to as a passive party. A sample label owned by the active party is one of important data needed to be protected in the joint training model.

SUMMARY

Embodiments of the present application propose a data protection method and apparatus, a server and a medium.

In a first aspect, an embodiment of the application provides a data protection method, the method comprises: acquiring gradient correlation information respectively corresponding to a target sample and a reference sample belonging to the same batch as the target sample, wherein a sample set to which the target sample belongs pertains to a binary classification sample set that is imbalanced in distribution; generating information of to-be-added data noise according to a comparison result of the gradient correlation information corresponding to the target sample and the gradient correlation information corresponding to the reference sample; correcting an initial gradient transfer value corresponding to the target sample according to the information of the to-be-added data noise, to generate corrected gradient transfer information, so as to enable gradient transfer information corresponding to samples belonging to different categories in the sample set to be consistent, wherein the initial gradient transfer value is used for indicating that a trained joint training model is adjusted according to the target sample; and sending the gradient transfer information to a passive party of the joint training model, so as to enable the passive party to adjust a parameter of the joint training model according to the gradient transfer information.

In some embodiments, the gradient correlation information comprises a sample label used for characterizing a sample category and a sample prediction probability, wherein the sample prediction probability is used for characterizing a probability that a sample is predicted to be in a preset category label by the joint training model, the preset category label comprises a sample label with a small proportion in the sample set, and the reference sample comprises a sample of which a sample prediction probability meets a preset probability condition and a sample label is consistent with the preset category label; and generating the information of the to-be-added data noise according to the comparison result of the gradient correlation information corresponding to the target sample and the gradient correlation information corresponding to the reference sample comprises: generating a standard deviation of to-be-added data noise matched with the target sample according to whether the sample label corresponding to the target sample is consistent with the preset category label.

In some embodiments, generating the standard deviation of the to-be-added data noise matched with the target sample according to whether the sample label corresponding to the target sample is consistent with the preset category label comprises: in response to determining that the sample label corresponding to the target sample is inconsistent with the preset category label, generating a first standard deviation as the standard deviation of the to-be-added data noise matched with the target sample, wherein the first standard deviation is in negative correlation with a sample prediction probability corresponding to the target sample.

In some embodiments, generating the standard deviation of the to-be-added data noise matched with the target sample according to whether the sample label corresponding to the target sample is consistent with the preset category label comprises: in response to determining that the sample label corresponding to the target sample is consistent with the preset category label and a sample prediction probability corresponding to the target sample is greater than a sample prediction probability of the reference sample, generating a second standard deviation as the standard deviation of the to-be-added data noise matched with the target sample, wherein the second standard deviation is in positive correlation with the sample prediction probability corresponding to the target sample.

In some embodiments, the reference sample comprises a sample with a minimum sample prediction probability in samples that are in the same batch as the target sample and have sample labels consistent with the preset category label.

In some embodiments, the gradient correlation information comprises a gradient modulus used for indicating a gradient modulus of a loss function, corresponding to a sample, on a parameter of a model part belonging to the passive party; and generating the information of the to-be-added data noise according to the comparison result of the gradient correlation information corresponding to the target sample and the gradient correlation information corresponding to the reference sample comprises: in response to determining that a gradient modulus corresponding to the target sample is smaller than a gradient modulus corresponding to the reference sample, generating a third standard deviation as the standard deviation of the to-be-added data noise matched with the target sample, wherein the third standard deviation is in negative correlation with the gradient modulus corresponding to the target sample.

In some embodiments, the reference sample comprises a sample with a maximum gradient modulus in the samples in the same batch as the target sample.

In a second aspect, an embodiment of the application provides a data protection apparatus, the apparatus comprises: an acquisition unit configured to acquire gradient correlation information respectively corresponding to a target sample and a reference sample belonging to the same batch as the target sample, wherein a sample set to which the target sample belongs pertains to a binary classification sample set that is imbalanced in distribution; a generation unit configured to generate information of to-be-added data noise according to a comparison result of the gradient correlation information corresponding to the target sample and the gradient correlation information corresponding to the reference sample; a correction unit configured to correct an initial gradient transfer value corresponding to the target sample according to the information of the to-be-added data noise, to generate the corrected gradient transfer information, so as to enable gradient transfer information corresponding to samples belonging to different categories in the sample set to be consistent, wherein the initial gradient transfer value is used for indicating that a trained joint training model is adjusted according to the target sample; and a sending unit configured to send the gradient transfer information to a passive party of the joint training model, so as to enable the passive party to adjust a parameter of the joint training model according to the gradient transfer information.

In some embodiments, the gradient correlation information comprises a sample label used for characterizing a sample category and a sample prediction probability, wherein the sample prediction probability is used for characterizing a probability that a sample is predicted to be in a preset category label by the joint training model, the preset category label comprises a sample label with a small proportion in the sample set, and the reference sample comprises a sample of which a sample prediction probability meets a preset probability condition and a sample label is consistent with the preset category label; and the generation unit is further configured to generate a standard deviation of to-be-added data noise matched with the target sample according to whether the sample label corresponding to the target sample is consistent with the preset category label.

In some embodiments, the generation unit is further configured to: in response to determining that the sample label corresponding to the target sample is inconsistent with the preset category label, generate a first standard deviation as the standard deviation of the to-be-added data noise matched with the target sample, wherein the first standard deviation is in negative correlation with a sample prediction probability corresponding to the target sample.

In some embodiments, the generation unit is further configured to: in response to determining that the sample label corresponding to the target sample is consistent with the preset category label and a sample prediction probability corresponding to the target sample is greater than a sample prediction probability of the reference sample, generate a second standard deviation as the standard deviation of the to-be-added data noise matched with the target sample, wherein the second standard deviation is in positive correlation with the sample prediction probability corresponding to the target sample.

In some embodiments, the reference sample comprises a sample with a minimum sample prediction probability in samples that are in the same batch as the target sample and have sample labels consistent with the preset category label.

In some embodiments, the gradient correlation information comprises a gradient modulus used for indicating a gradient modulus of a loss function, corresponding to a sample, on a parameter of a model part belonging to the passive party; and the generation unit is further configured to: in response to determining that a gradient modulus corresponding to the target sample is smaller than a gradient modulus corresponding to the reference sample, generate a third standard deviation as the standard deviation of the to-be-added data noise matched with the target sample, wherein the third standard deviation is in negative correlation with the gradient modulus corresponding to the target sample.

In some embodiments, the reference sample comprises a sample with a maximum gradient modulus in the samples in the same batch as the target sample.

In a second aspect, an embodiment of the application provides a server, the server comprises: one or more processors; a storage device storing one or more programs therein; when the one or more programs are executed by the one or more processors, cause the one or more processors to implement the method described in any one implementation in the first aspect.

In a second aspect, an embodiment of the application provides a computer readable medium storing a computer program therein, wherein when the computer program is executed by a processor, cause the processor to implement the method described in any one implementation in the first aspect.

According to a data protection method and device, a server and a medium provided by embodiments of the present application, gradient correlation information respectively corresponding to a target sample and a reference sample belonging to the same batch as the target sample is acquired, wherein a sample set to which the target sample belongs pertains to a binary classification sample set that is imbalanced in distribution; information of to-be-added data noise is generated according to a comparison result of the gradient correlation information corresponding to the target sample and the gradient correlation information corresponding to the reference sample; an initial gradient transfer value corresponding to the target sample is corrected according to the information of the to-be-added data noise, and corrected gradient transfer information is generated, so as to enable gradient transfer information corresponding to samples belonging to different categories in the sample set to be consistent, wherein the initial gradient transfer value is used for indicating that a trained joint training model is adjusted according to the target sample; and the gradient transfer information is sent to a passive party of the joint training model, so as to enable the passive party to adjust a parameter of the joint training model according to the gradient transfer information. Therefore, the consistency of the corrected gradient transfer information corresponding to positive and negative samples is ensured, and the data security is powerfully protected.

BRIEF DESCRIPTION OF THE DRAWINGS

Other features, objectives and advantages of the present application will become more apparent by reading detailed description of non-restrictive embodiments made with reference to the following drawings.

DETAILED DESCRIPTION OF THE EMBODIMENTS

The present application will be further described in detail below with reference to the accompanying drawings and embodiments. It should be understood that the specific embodiments described herein are only used to explain the related disclosure, but not to limit the disclosure. In addition, it should be noted that, for the convenience of description, only the parts related to the related disclosure are shown in the drawings.

It should be noted that the embodiments in the present application and the features of the embodiments may be combined with each other in the case of no conflict. The present application will be described in detail below with reference to the accompanying drawings and in conjunction with the embodiments.

Figure 1:
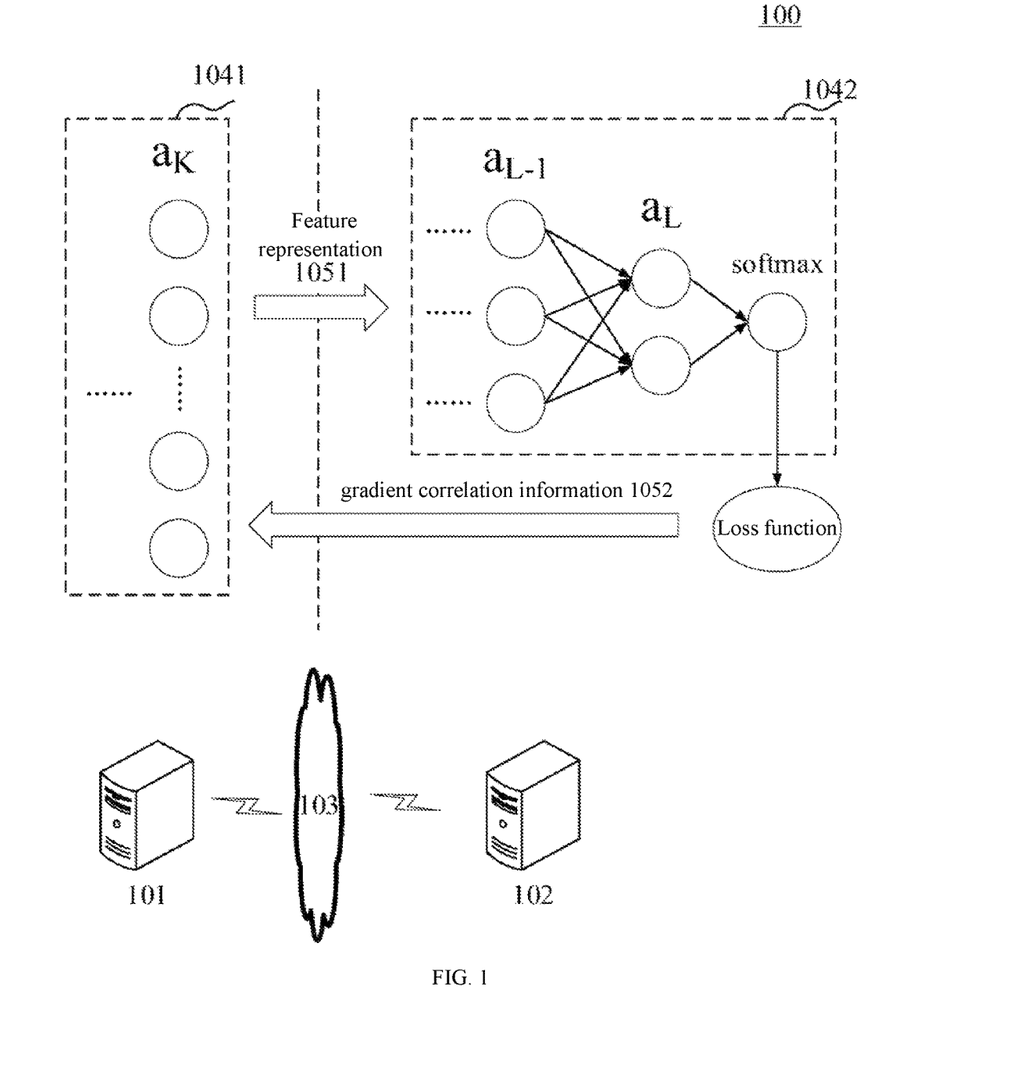
FIG. 1 is a diagram of an exemplary system architecture to which an embodiment of the present application can be applied.

FIG. 1 shows an exemplary architecture 100 to which the data protection method or data protection apparatus of the present application may be applied.

As shown in FIG. 1, the system architecture 100 may include terminal devices 101, 102, 103, networks 104, 106 and servers 105, 107. The networks 104, 106 are used to provide a medium of communication links between the terminal devices 101, 102, 103 and the server 105, and between the server 105 and the server 107, respectively. The networks 104, 106 may include various connection types, such as wired, wireless communication links, or fiber optic cables, among others.

The servers 101 and 102 can interact through the network 103 to receive or send messages and the like. Servers 101 and 102 may be servers belonging to different parties of the joint training model. As an example, the server 101 as a passive party may be used to train the subsection 1041 of the joint training model. The subsection 1041 of the joint training model may be used to convert training samples input by the joint training model into feature representation (embedding) 1051. The output layer of the subsection 1041 of the joint training model may include K neurons. The server 101 may send the feature representation 1051 to the server 102 as an active party. Server 102 may be used to train a subsection 1042 of the jointly trained model. The subsection 1042 of the joint training model can be used to convert the feature representation obtained by combining the received feature representation 1051 and the feature representation generated by the active party into a predicted probability of the input training sample corresponding to the preset label. The active party may generate the feature representation through feature engineering, or may use a model similar to the subsection 1041 of the joint training model to generate the feature representation. After that, the server 102 determines gradient related information 1052 using the difference between the obtained probability and the sample label corresponding to the input sample. The gradient-related information 1052 may include, for example, the gradient of the preset loss function corresponding to each neuron in the output layer of the subsection 1041 of the joint training model. Next, the server 102 may send the determined gradient-related information 1052 to the server 101, so that the server 101 adjusts a parameter corresponding to each neuron in the output layer of the subsection 1041 of the joint training model according to the obtained gradient-related information 1052.

It should be noted that the subsection 1042 of the joint training model may include a hidden layer (the (L−1) layer as shown in FIG. 1), a logit model (the Lth layer as shown in FIG. 1), and a softmax layer. The preset loss function may include a cross entropy loss (Cross Entropy Loss) function.

It should be noted that the server may be hardware or software. When the server is hardware, it can be implemented as a distributed server cluster composed of multiple servers, or can be implemented as a single server. When the server is software, it can be implemented as a plurality of software or software modules (for example, software or software modules for providing distributed services), or can be implemented as a single software or software module. There is no specific limitation here.

It should be noted that the data protection method provided by the embodiments of the present application is generally executed by the server 102, and accordingly, the data protection apparatus is generally provided in the server 102.

It should be understood that the number of servers and networks in FIG. 1 is merely illustrative. There can be any number of servers and networks depending on the implementation needs.

Figure 2:
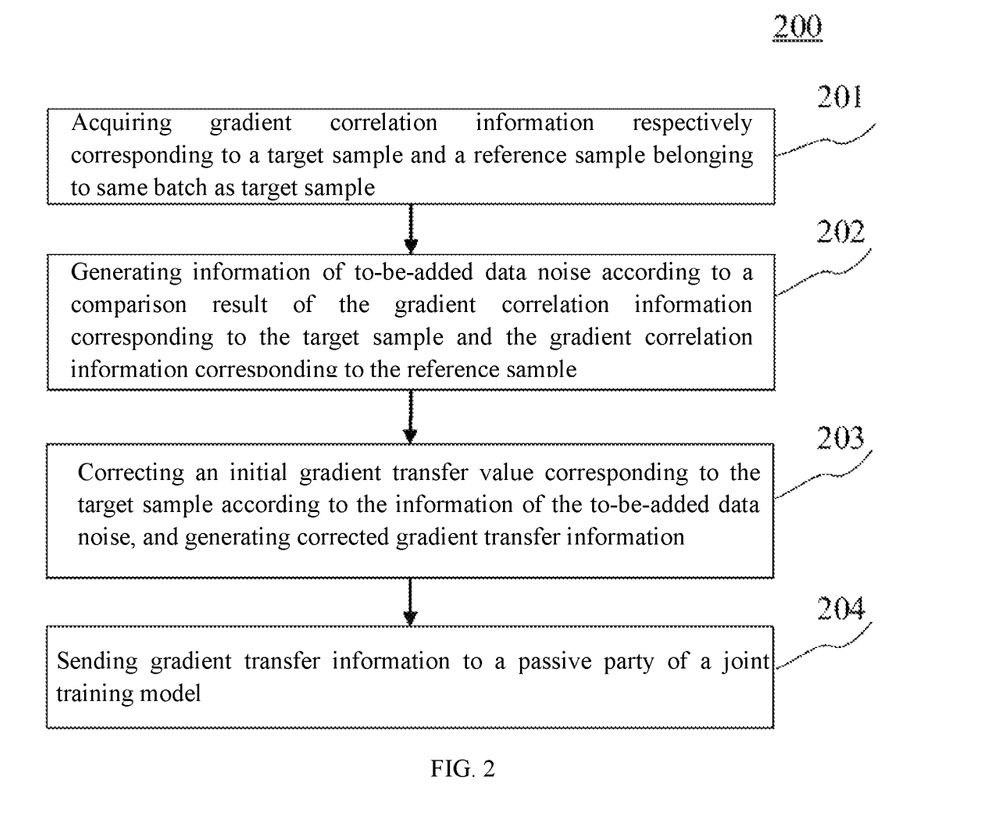
FIG. 2 is a flow chart of an embodiment of a data protection method according to the present application.

A continued reference is made to FIG. 2 that shows a flow chart 200 of an embodiment of a data protection method according to the present application. The data protection method includes the following steps.

Step 201, gradient correlation information respectively corresponding to a target sample and a reference sample belonging to the same batch as the target sample is acquired.

In the present embodiment, an execution body (e.g., a server 102 as shown in FIG. 1) of the data protection method can acquire the gradient correlation information respectively corresponding to the target sample and the reference sample belonging to the same batch as the target sample through a wired connection manner or a wireless connection manner. A sample set to which the target sample belongs typically pertains to a binary classification sample set that is imbalanced in distribution. The above imbalanced distribution is generally used for characterizing different proportions of positive samples and negative samples, and is especially suitable for scenarios with a large proportion difference (for example, the proportion of the positive samples is 25%, and the proportion of the negative samples is 75%).

It needs to be noted that a joint training model usually adopts a manner of inputting a batch of samples into an initial model for training each time in a training process. The target sample and the reference sample generally belong to the same batch of training samples.

In the embodiment, as an example, the execution body may obtain a pre-stored sample set from an electronic device (e.g., a database server) in local or communication connection. Then, the execution body can select a batch of samples from the sample set, input the samples into a to-be-trained joint training model, and obtain output results corresponding to the input samples through forward propagation. Afterwards, the execution body determines gradient correlation information corresponding to the respective input samples according to the obtained output results. The target sample can be any pre-specified sample, and can also be a sample which is selected according to a preset rule and is different from the reference sample.

In some optional implementations of the embodiment, the gradient correlation information may include a sample label used for characterizing a sample category and a sample prediction probability. The sample prediction probability is used for characterizing a probability that a sample is predicted to be in a preset category label by the joint training model. The preset category label may include sample labels with a small proportion in the binary classification sample set with unbalanced distribution. As an example, when negative samples (for example, 70% in proportion) in the sample set are obviously more than positive samples (for example, 30% in proportion), the preset category label can be information (for example, "+1") characterizing the positive samples. The reference sample may include a sample of which a sample prediction probability meets a preset probability condition and a sample label is consistent with the preset category label. The preset probability condition, for example, may include that sample prediction probabilities are in the top M of sample prediction probabilities that correspond to samples in the sample set and are ranked from low to high. A value of the M may be pre-specified, for example, 3, 5, etc., according to a batch size of samples in each batch.

It needs to be noted that the sample set is in binary classification, so that when the preset category label is a sample label with a large proportion in the binary classification sample set with unbalanced distribution, the reference sample may include a sample of which a sample prediction probability meets the preset probability condition and a sample label is inconsistent with the preset category label. The preset probability condition, for example, may include that the sample prediction probabilities are in the top N of sample prediction probabilities that correspond to samples in the sample set and are ranked from high to low. A value of the N may be pre-specified, for example, 3, 5, etc., according to a batch size of samples in each batch. The two situations are equivalent, and the first situation is taken as an example for specific illustration in the subsequent analysis.

In some optional implementations of the embodiment, based on that the preset category label includes the sample label with the small proportion in the sample set, the reference sample may include a sample with a minimum sample prediction probability in samples that are in the same batch as the target sample and have sample labels consistent with the preset category label.

Step 202, information of to-be-added data noise is generated according to a comparison result of the gradient correlation information corresponding to the target sample and the gradient correlation information corresponding to the reference sample.

In the embodiment, according to the comparison result of the gradient correlation information corresponding to the target sample and the gradient correlation information corresponding to the reference sample obtained in the step 201, the execution body may generate the information of the to-be-added data noise in various manners. The information of the to-be-added data noise may include statistical values. The statistical values may generally include, but are not limited to, at least one of a mean, a variance, or a standard deviation.

In some optional implementations of the embodiment, based on the sample label used for characterizing the sample category and the sample prediction probability, which are included in the gradient correlation information, and the reference sample of which the sample prediction probability meets the preset probability condition and the sample label is consistent with the preset category label, the execution body can generate a standard deviation of to-be-added data noise matched with the target sample according to whether the sample label corresponding to the target sample is consistent with the preset category label.

Optionally, in response to determining that the sample label corresponding to the target sample is inconsistent with the preset category label, the execution body may generate a first standard deviation as the standard deviation of the to-be-added data noise matched with the target sample.

In these implementations, the first standard deviation is generally in negative correlation with a sample prediction probability corresponding to the target sample. As an example, the first standard deviation may be $$\sqrt{\frac{(1-p_i)^2}{p_k^2} - 1},$$

wherein the $P_i$ can be used for characterizing the sample prediction probability corresponding to the reference sample, and the $P_k$ can be used for characterizing the sample prediction probability corresponding to the target sample.

Optionally, in response to determining that the sample label corresponding to the target sample is consistent with the preset category label and the sample prediction probability corresponding to the target sample is greater than the sample prediction probability of the reference sample, the execution body may generate a second standard deviation as the standard deviation of the to-be-added data noise matched with the target sample.

In these implementations, the second standard deviation is generally in positive correlation with the sample prediction probability corresponding to the target sample. As an example, the second standard deviation may be $$\sqrt{\frac{(1-p_i)^2}{(1-p_k)^2} - 1}.$$

The $P_i$ can be used for characterizing the sample prediction probability corresponding to the reference sample. The $P_k$ can be used for characterizing the sample prediction probability corresponding to the target sample.

On the basis of the above optional implementations, when a selected reference sample is the sample with the minimum sample prediction probability in the samples with the sample labels consistent with the preset category label, noise superposition can be carried out on samples, except the reference sample, in the same batch as the target sample, so that the gradient transfer information corresponding to the samples in the same batch can be corrected in a consistent manner, the influence on adjustment of parameters of the model caused by noise superposition on the gradient transfer information corresponding to the samples in the same batch can be offset maximumly, thereby achieving a balance on the training effect of the model.

Step 203, an initial gradient transfer value corresponding to the target sample is corrected according to the information of the to-be-added data noise, and corrected gradient transfer information is generated.

In the embodiment, the execution body can firstly obtain an initial gradient transfer value corresponding to the target sample. The initial gradient transfer value can be used for indicating that the trained joint training model is adjusted according to the target sample. That is, the initial gradient transfer value can be used for characterizing a basis that is transferred from an active party to a passive party of the joint training model and is used for adjusting parameters of the joint training model. As an example, the initial gradient transfer value may include a gradient (e.g., gradient-related information 1052 as shown in FIG. 1) corresponding to each neuron in an output layer of a model corresponding to input samples and trained by the passive party of the joint training model using a preset loss function. Specifically, the initial gradient transfer value can be determined by the following steps.

For a subsection 1042 of the joint training model described in FIG. 1, it is assumed that a loss function as shown by a formula (1) is adopted:

$$l(x, c) = -\log \frac{e^{y_c}}{\sum_j e^{y_i}}, \quad (1)$$

wherein x can be used for characterizing a sample input into the joint training model, C is used for characterizing a sample label corresponding to the input sample, $y=[y_1, y_2, \ldots, y_j]$ can be used for characterizing the output of a logit model, and $y_i$ may be used for characterizing a score (logit score) that a label of the input sample is predicted to be a category label i.

Therefore, the gradient of the loss function on the logit can be as shown by a formula (2):

$$g_i = \frac{\partial l(x,c)}{\partial y_i} = -\frac{\partial \log(e^{y_c}) - \partial \log\left(\sum_j e^{y_i}\right)}{\partial y_i} = \begin{cases} -1 + \frac{e^{y_i}}{\sum_j e^{y_i}}, & i = c \\ \frac{e^{y_i}}{\sum_j e^{y_i}}, & i \neq c \end{cases}. \quad (2)$$

The probability that the label of the input sample is predicted to be the category label i can be shown as in a formula (3):

$$p_i = \frac{e^{y_i}}{\sum_j e^{y_i}}. \quad (3)$$

Then, the gradient corresponding to each neuron in the output layer of the subsection 1041 of the model trained by the passive party of the joint training model using the loss function can be as shown by a formula (4):

$$\nabla a_K = \sum_i \frac{\partial l(x,c)}{\partial y_i} \cdot \frac{\partial y_i}{\partial a_K} = \sum_i g_i \cdot \frac{\partial y_i}{\partial a_K}. \quad (4)$$

Under the condition that the logit model is in binary classification, assuming that the category label i is used for characterizing a positive sample, and when the sample label of the target sample is consistent or inconsistent with the category label, the initial gradient transfer value corresponding to the target sample can be as shown by a formula (5) or a formula (6):

$$\nabla a_K^1 = g_0 \cdot \frac{\partial y_0}{\partial a_K} + g_1 \cdot \frac{\partial y_i}{\partial a_K} = \quad (5)$$

-continued $$p_0 \cdot \frac{\partial y_0}{\partial a_K} + (-1 + p_1) \cdot \frac{\partial y_1}{\partial a_K} + (1 - p_1) \cdot \left(\frac{\partial y_0}{\partial a_K} - \frac{\partial y_i}{\partial a_K}\right),$$

$$\nabla a_K^0 = \quad (6)$$

$$g_0 \cdot \frac{\partial y_0}{\partial a_K} + g_1 \cdot \frac{\partial y_i}{\partial a_K} = (-1 + p_0) \cdot \frac{\partial y_0}{\partial a_K} + p_1 \frac{\partial y_i}{\partial a_K} = -p_1 \cdot \left(\frac{\partial y_0}{\partial a_K} - \frac{\partial y_i}{\partial a_K}\right).$$

Therefore, the inventor found that in a sample set with unbalanced distribution, the sample labels corresponding to the samples can be generally distinguished through the batch sizes of $(1-p_1)^2$ and $p_1^2$. That is, the gradient modulus of the positive sample is significantly greater than the gradient modulus of the negative sample.

In the embodiment of the present application, the execution body may correct the initial gradient transfer value corresponding to the target sample according to a method consistent with the step 202 of generating the information of the to-be-added data noise, and the corrected gradient transfer information is generated, so that gradient transfer information corresponding to samples corresponding to different sample labels is consistent.

As an example, the to-be-added data noise conforms to a distribution that the mean of the to-be-added data noise is 0 and the standard deviation of the to-be-added data noise is σ, that is, noise~N (0, σ²). The noise may include, but is not limited to, at least one of Gaussian noise, and uniform distribution noise. Then, the execution body can correct the initial gradient transfer value g corresponding to the target sample to be g'=g·(1+noise) as the corrected gradient transfer information. It is noted below that the gradient transfer information corresponding to the samples corresponding to the different sample labels can be consistent through the correction:

for a target sample (i.e., a negative sample) having a sample label inconsistent with the preset category label i, noise conforming to N(0, σ²) distribution is added, wherein a value of σ is taken as the first standard deviation, i.e., $$\sigma = \sqrt{\frac{(1-p_i)^2}{p_k^2} - 1},$$

for example, then $$E(p_k^2 \cdot (1+\sigma)^2) = E(p_k^2 \cdot (1+2\sigma+\sigma^2)) = E(p_k^2 \cdot (1+\sigma^2)) = ((1-p_i)^2). \quad (7).$$

Therefore, the expectation of the modulus of the gradient transfer information corresponding to the corrected target sample is equal to the expectation of the modulus of the gradient transfer information corresponding to the reference sample.

Correspondingly, for the target sample which has the sample label consistent with the preset category label i (i.e., the positive sample) and has the corresponding sample prediction probability greater than the sample prediction probability of the reference sample, noise conforming to N (0, σ²) distribution is added, wherein a value of σ is taken as the second standard deviation, i.e., $$\sigma = \sqrt{\frac{(1-p_i)^2}{(1-p_k)^2} - 1},$$

for example, then:

$$E((1-p_k)^2 \cdot (1+\sigma)^2) = E((1-p_k)^2 \cdot (1+2\sigma+\sigma^2)) = E((1-p_k)^2 \cdot (1+\sigma^2)) = E((1-p_t)^2) \quad (8).$$

Therefore, the expectation of the modulus of the gradient transfer information corresponding to the corrected target sample is equal to the expectation of the modulus of the gradient transfer information corresponding to the reference sample.

Step 204, the gradient transfer information is sent to the passive party of the joint training model.

In the embodiment of the present application, the execution body can send the gradient transfer information obtained in the step 203 to the passive party of the joint training model, so that the passive party adjusts the parameters of the joint training model according to the gradient transfer information. As an example, the passive party may perform derivation based on a chain rule according to the gradient transfer information to update the parameters of the joint training model (e.g., the subsection 1041 of the joint training model as shown in FIG. 1) at the passive party side.

Figure 3:
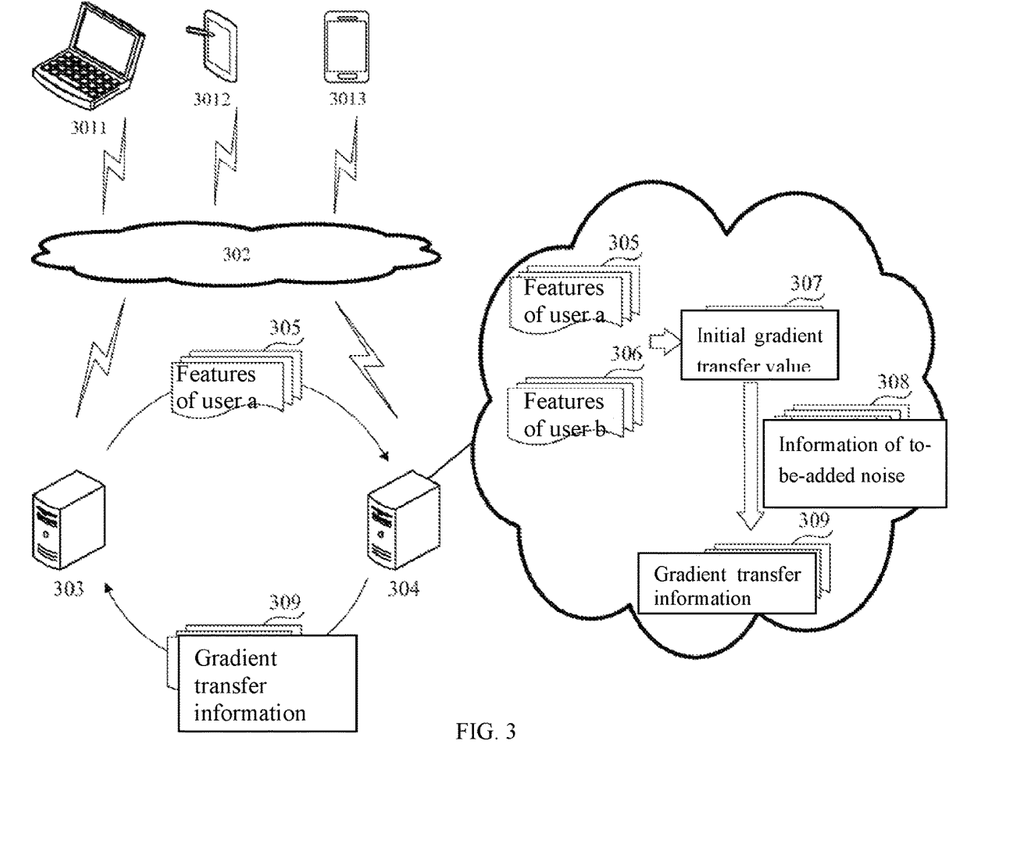
FIG. 3 is a schematic diagram of an application scenario of a data protection method according to an embodiment of the present application.

A continued reference is made to FIG. 3 that is a schematic diagram of an application scenario of a data protection method according to an embodiment of the present application. In the application scenario of FIG. 3, a user browses an article presented by an application program A through terminal devices (e.g., 3011, 3012 and 3013 in FIG. 3) and jumps to commodity information presented by an application program B by clicking a link in the article. The terminal devices (e.g., 3011, 3012 and 3013 in FIG. 3) are in communication connection with back-end servers 303, 304 of the application programs A and B through a network 302. The back-end server 303 obtains user information through a client of the application program A, and obtains features 305 of a user a by using the locally stored joint training model part, wherein the features 305 of the user a are usually extracted according to original data acquired by the application program A. The back-end server 304 can generate a sample label for characterizing a positive sample or a negative sample according to whether an order request sent by a client of the application program B is received. Features 306 of a user b are generally extracted from raw data acquired by the application program B. The back-end server 304 can acquire the probability of being a sample label through prediction by using the locally stored joint training model part, and generates an initial gradient transfer value 307 corresponding to each user information according to a sample label corresponding to each user information and a preset loss function. The back-end server 304 can generate to-be-added noise information 308 corresponding to each user information according to the manner described in the above embodiment. Afterwards, the back-end server 304 can correct the generated initial gradient transfer value 307 according to the to-be-added noise information 308 to generate corrected gradient transfer information (309). Finally, the back-end server 304 can send the generated corrected gradient transfer information 309 to the back-end server 303, so that the back-end server 303 adjusts parameters of the local joint training model part according to the gradient transfer information.

In the process of implementing the method, the inventor found that under the condition that data of the active party and the passive party overlap more in a user dimension and overlap less in a feature dimension, when a loss function that is generally used in the prior art is applied to a binary classification task with unbalanced sample data distribution, gradient-related information that is acquired from the positive and negative samples and is used for adjusting the parameters of the joint training model produces differentiation. One of the prior art is generally that the gradient transfer value obtained by the active party of the joint training model for different training samples and used for indicating the passive party to adjust the parameters of the model are directly sent to the passive party, resulting in data security risks in unprocessed gradient transfer values (e.g., the positive and negative samples are deduced from the magnitude of the transferred gradient modulus). According to the method provided by the above embodiment of the present application, the information of the to-be-added data noise is determined by the gradient correlation information corresponding to the target sample and the reference sample, and the initial gradient transfer value is corrected by using the generated data noise, so that the consistency of the corrected gradient transfer information corresponding to the positive and negative samples is ensured, thereby powerfully protecting the data security.

Figure 4:
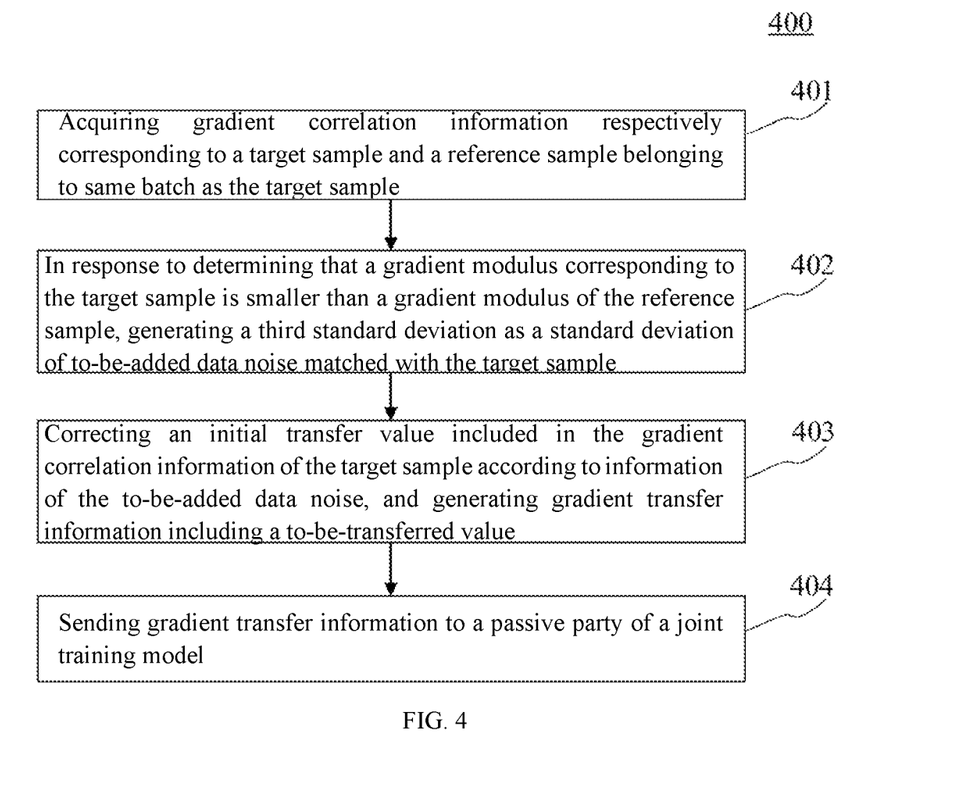
FIG. 4 is a flow chart of another embodiment of a data protection method according to the present application.

Further reference is made to FIG. 4 that shows a flow chart 400 of another embodiment of a data protection method. The flow chart 400 of the data protection method includes the following steps.

Step 401, gradient correlation information respectively corresponding to a target sample and a reference sample belonging to the same batch as the target sample are acquired.

In the embodiment, an execution body (e.g., a server 102 shown in FIG. 1) of the data protection method may acquire the gradient correlation information according to a manner consistent with that of the step 201 in the above embodiment. A sample set to which the target sample belongs pertains to a binary classification sample set that is imbalanced in distribution. The gradient correlation information may include a gradient modulus. The gradient modulus may be used for indicating a gradient modulus of a loss function, corresponding to a sample, on a parameter of the model part belonging to the passive party. The reference sample may include a sample of which a gradient modulus meets a preset gradient condition. The preset gradient condition, for example, may include that the gradient moduli are in the top Q of gradient moduli that correspond to samples in the sample set and are ranked from high to low. A value of the Q may be pre-specified, for example, 3, 5, etc., according to a batch size of samples in each batch.

In some optional implementations of the embodiment, the reference sample may include a sample with a maximum gradient modulus in samples in the same batch as the target sample.

Step 402, in response to determining that a gradient modulus corresponding to the target sample is smaller than a gradient modulus of the reference sample, a third standard deviation is generated as the standard deviation of the to-be-added data noise matched with the target sample.

In the embodiment, in response to determining that the gradient modulus corresponding to the target sample is smaller than the gradient modulus of the reference sample, the execution body may generate a third standard deviation as the standard deviation of the to-be-added data noise matched with the target sample. The third standard deviation is generally in negative correlation with the gradient modulus corresponding to the target sample. As an example, when a mean of the added data noise is 0, the third standard deviation may be $$\sigma = \sqrt{\frac{\|g_i\|^2}{\|g_k\|^2} - 1},$$

wherein the $\|g_i\|$ can be used for characterizing the gradient modulus corresponding to the reference sample. The $\|g_k\|$ can be used for characterizing the gradient modulus corresponding to the target sample.

The specific derivation process of the third standard deviation can be as shown by a formula (9):

$$E(\|g_i\|^2) = E(\|g_i\|^2 \cdot (1 + 2\sigma + \sigma^2)) \quad (9)$$
$$E(\|g_i\|^2) = E(\|g_i\|^2 \cdot (1 + \sigma^2))$$
$$\sigma = \frac{\|g_i\|^2}{\|g_k\|^2} - 1$$
$$\sigma = \sqrt{\frac{\|g_i\|^2}{\|g_k\|^2} - 1}.$$

It needs to be noted that, similar to the step 402 in the above embodiment, the execution body can make gradient transfer information corresponding to samples corresponding to different sample labels consistent by using the standard deviation of the generated data noise, which is not described in detail here.

On the basis of the optional implementations, when the selected reference sample is the sample with the maximum gradient modulus in the samples in the same batch as the target sample, noise superposition can be carried out on samples, except the reference sample, in the same batch as the target sample, so that the gradient transfer information corresponding to the samples in the same batch can be corrected in a consistent manner, the influence on adjustment of parameters of the model caused by noise superposition on the gradient transfer information corresponding to the samples in the same batch can be offset maximumly, thereby achieving a balance on the training effect of the model.

Step 403, an initial transfer value included in the gradient correlation information of the target sample is corrected according to the information of the to-be-added data noise, and gradient transfer information including a to-be-transferred value is generated.

Step 404, the gradient transfer information is sent to a passive party of a joint training model.

The step 403 and the step 404 are respectively consistent with the step 203 and the step 204 in the above embodiment, the description of the step 203 and the step 204 is also suitable for that of the step 403 and the step 404, which is not described in detail here.

It can be seen from FIG. 4 that the flow chart 400 of the data protection method in the embodiment shows the step of determining the information of the to-be-added data noise according to the gradient modulus corresponding to the target sample and the gradient modulus corresponding to the reference sample. Therefore, according to the solution described by the embodiment, the information of the to-be-added data noise can be determined only through the gradient modulus information without additionally acquiring the label information and the prediction probability information corresponding to the sample, so that the data transmission quantity is reduced, and the model training efficiency is improved.

Figure 5:
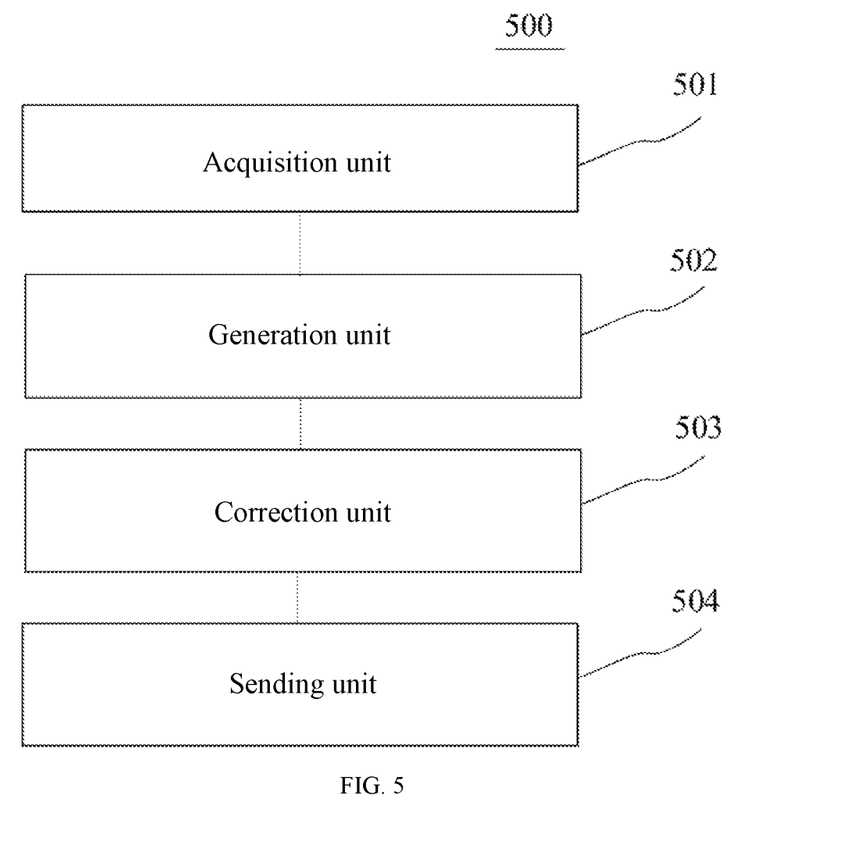
FIG. 5 is a structural schematic diagram of an embodiment of a data protection apparatus according to the present application.

Further referring to FIG. 5, as an implementation of the methods illustrated in the above-described drawings, the present application provides an embodiment of a data protection apparatus, the embodiment of the apparatus corresponds to the embodiment of the method as shown in FIG. 2 or FIG. 4, and the apparatus can be specifically applied to various electronic devices.

As shown in FIG. 5, the data protection apparatus 500 provided by the embodiment includes an acquisition unit 501, a generation unit 502, a correction unit 503 and a sending unit 504. The acquisition unit 501 is configured to acquire gradient correlation information respectively corresponding to a target sample and a reference sample belonging to the same batch as the target sample, wherein a sample set to which the target sample belongs pertains to a binary classification sample set that is imbalanced in distribution; the generation unit 502 is configured to generate information of to-be-added data noise according to a comparison result of the gradient correlation information corresponding to the target sample and the gradient correlation information corresponding to the reference sample; the correction unit 503 is configured to correct an initial gradient transfer value corresponding to the target sample according to the information of the to-be-added data noise, and generate corrected gradient transfer information, so as to enable gradient transfer information corresponding to samples belonging to different categories in the sample set to be consistent, wherein the initial gradient transfer value is used for indicating that a trained joint training model is adjusted according to the target sample; and a sending unit 504 is configured to send the gradient transfer information to a passive party of the joint training model, so as to enable the passive party to adjust parameters of the joint training model according to the gradient transfer information.

In the embodiment, in the data protection apparatus 500, the specific processing of the acquisition unit 501, the generation unit 502, the correction unit 503 and the sending unit 504 and technical effects brought by the specific processing can respectively refer to related descriptions of the step 201, the step 202, the step 203 and the step 204 in the corresponding embodiment of FIG. 2 or FIG. 4, which are not described in detail here.

In some optional implementations of the embodiment, the gradient correlation information may include a sample label used for characterizing a sample category and a sample prediction probability. The sample prediction probability can be used for characterizing a probability that a sample is predicted to be in a preset category label through the joint training model. The preset category label may include sample labels with a small proportion in the sample set. The reference sample may include a sample of which a sample prediction probability meets a preset probability condition and a sample label is consistent with the preset category label. The generation unit 502 may be further configured to generate a standard deviation of to-be-added data noise matched with the target sample according to whether the sample label corresponding to the target sample is consistent with the preset category label.

In some optional implementations of the embodiment, the generation unit 502 may be further configured to generate a first standard deviation as the standard deviation of the to-be-added data noise matched with the target sample in response to determining that the sample label corresponding to the target sample is inconsistent with the preset category label, wherein the first standard deviation is in negative correlation with a sample prediction probability corresponding to the target sample.

In some optional implementations of the embodiment, the generation unit 502 may be further configured to generate a second standard deviation as the standard deviation of the to-be-added data noise matched with the target sample in response to determining that the sample label corresponding to the target sample is consistent with the preset category label and the sample prediction probability corresponding to the target sample is greater than a sample prediction probability of the reference sample, wherein the second standard deviation is in positive correlation with the sample prediction probability corresponding to the target sample.

In some optional implementations of the embodiment, the reference sample may include a sample with a minimum sample prediction probability in samples that are in the same batch as the target sample and have sample labels consistent with the preset category label.

In some optional implementations of the embodiment, the gradient correlation information may include a gradient modulus. The gradient modulus may be used for indicating a gradient modulus of a loss function, corresponding to a sample, for a parameter of the model part belonging to the passive party. The generation unit 502 may be further configured to generate a third standard deviation as the standard deviation of the to-be-added data noise matched with the target sample in response to determining that a gradient modulus corresponding to the target sample is smaller than a gradient modulus of the reference sample. The third standard deviation is in negative correlation with the gradient modulus corresponding to the target sample.

In some optional implementations of the embodiment, the reference sample may include a sample with a maximum gradient modulus in the samples in the same batch as the target sample.

According to the apparatus provided by the embodiment of the present application, the acquisition unit 501 acquires the gradient correlation information respectively corresponding to the target sample and the reference sample belonging to the same batch as the target sample, wherein the sample set to which the target sample belongs pertains to the binary classification sample set that is imbalanced in distribution; the generation unit 502 generates the information of the to-be-added data noise according to the comparison result of the gradient correlation information corresponding to the target sample and the gradient correlation information corresponding to the reference sample; the correction unit 503 corrects the initial gradient transfer value corresponding to the target sample according to the information of the to-be-added data noise, and generates the corrected gradient transfer information, so as to enable the gradient transfer information corresponding to the samples belonging to different categories in the sample set to be consistent, wherein the initial gradient transfer value is used for indicating that the trained joint training model is adjusted according to the target sample; and the sending unit 504 sends the gradient transfer information to the passive party of the joint training model, so as to enable the passive party to adjust the parameters of the joint training model according to the gradient transfer information. Therefore, the consistency of the corrected gradient transfer information corresponding to positive and negative samples is ensured, and the data security is powerfully protected.

Figure 6:
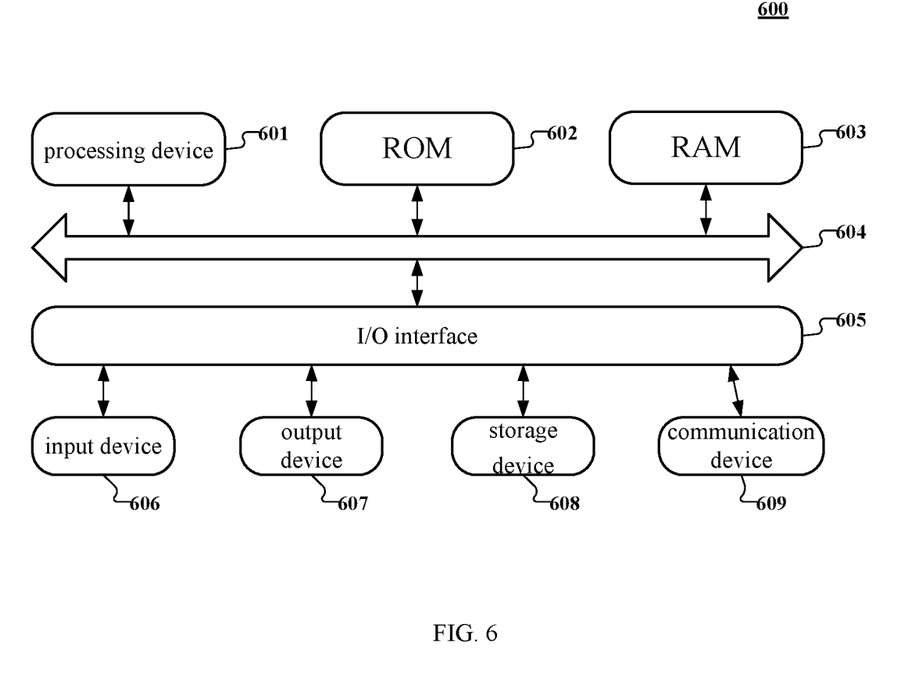
FIG. 6 is a structural schematic diagram of an electronic device adapted to implement embodiments of the present application.

Referring next to FIG. 6, it shows a schematic structural diagram of an electronic device (eg, the server in FIG. 1) 600 suitable for implementing an embodiment of the present application. The server shown in FIG. 6 is only an example, and should not impose any limitations on the functions and scope of use of the embodiments of the present application.

As shown in FIG. 6, an electronic device 600 may include a processing device (eg, a central processing unit, a graphics processor, etc.) 601 that may execute various appropriate actions and processes according to a program stored in a read only memory (ROM) 602 or a program be loaded into random access memory (RAM) 603 from a storage device 608. In the RAM 603, various programs and data necessary for the operation of the electronic device 600 are also stored. The processing device 601, the ROM 602, and the RAM 603 are connected to each other through a bus 604. An input/output (I/O) interface 605 is also connected to the bus 604.

Typically, the following devices can be connected to the I/O interface 605: an input device 606 including, for example, a touch screen, touch pad, keyboard, mouse, etc.; an output device 607 including, for example, a Liquid Crystal Display (LCD), speaker, vibrator, etc.; a storage device 608, including, for example, magnetic tape, hard disk, etc.; and a communication device 609. The communication device 609 may allow electronic device 600 to communicate wirelessly or by wire with other devices to exchange data. Although FIG. 6 shows an electronic device 600 having various devices, it should be understood that not all of the illustrated devices are required to be implemented or provided. More or fewer devices may alternatively be implemented or provided. Each block shown in FIG. 6 can represent one device, and can also represent multiple devices as required.

In particular, according to embodiments of the present application, the processes described above with reference to the flowcharts may be implemented as computer software programs. For example, embodiments of the present application include a computer program product comprising a computer program carried on a computer-readable medium, the computer program containing program code for performing the method illustrated in the flowchart. In such an embodiment, the computer program may be downloaded and installed from the network via the communication device 609, or from the storage device 608, or from the ROM 602. When the computer program is executed by the processing device 601, the above-mentioned functions defined in the methods of the embodiments of the present application are executed.

It should be noted that the computer-readable medium described in the embodiments of the present application may be a computer-readable signal medium or a computer-readable storage medium, or any combination thereof. The computer-readable storage medium can be, for example, but not limited to, an electrical, magnetic, optical, electromagnetic, infrared, or semiconductor system, apparatus or device, or a combination of thereof. More specific examples of computer readable storage media may include, but are not limited to, electrical connections with one or more wires, portable computer disks, hard disks, random access memory (RAM), read only memory (ROM), erasable Programmable read only memory (EPROM or flash memory), optical fiber, portable compact disk read only memory (CD-ROM), optical storage devices, magnetic storage devices, or any suitable combination thereof. In the embodiments of the present application, a computer-readable storage medium may be any tangible medium that contains or stores a program that can be used by or in conjunction with an instruction execution system, apparatus, or device. While in embodiments of the present application, a computer-readable signal medium may include a data signal in baseband or propagated as part of a carrier wave, carrying computer-readable program code therein. Such propagated data signals may take a variety of forms, including but not limited to electromagnetic signals, optical signals, or any suitable combination thereof. A computer-readable signal medium can also be any computer-readable medium other than a computer-readable storage medium, the computer-readable signal medium can transmit, propagate, or transport the program for use by or in connection with the instruction execution system, apparatus, or device. The program code contained on the computer-readable medium can be transmitted by any suitable medium, including but not limited to: electric wire, optical cable, RF (Radio Frequency, radio frequency), etc., or any suitable combination thereof.

The computer-readable medium may be included in the above-mentioned server; or may exist alone without being assembled into the server. The computer-readable medium carries one or more programs, and when the one or more programs are executed by the server, cause the server to: obtain the gradient correlation information corresponding to the target sample and the reference sample belonging to the same batch as the target sample respectively, where the sample set to which the target sample belongs pertains to a two-category sample set with an uneven distribution; according to the comparison result of the gradient correlation information corresponding to the target sample and the gradient correlation information corresponding to the reference sample, the information of to-be-added data noise is generated; The initial gradient transfer value corresponding to the target sample is corrected according to the information of the to-be-added data noise, to generate the corrected gradient transfer information, so that the gradient transfer information corresponding to the samples belonging to different categories in the sample set is consistent. The initial gradient transfer value is used to indicate to adjust the trained joint training model according to the target sample; sending the gradient transfer information to the passive party of the joint training model, so that the parameters of the joint training model is adjusted by the passive party according to the gradient transfer information.

Computer program code for performing the operations of the embodiments of the present application may be written in one or more programming languages, including object-oriented programming languages—such as Java, Smalltalk, C++, and including conventional procedural programming languages—such as the "C" language or similar programming languages. The program code may execute entirely on the user's computer, partly on the user's computer, as a stand-alone software package, partly on the user's computer and partly on a remote computer, or entirely on the remote computer or server. In the case of a remote computer, the remote computer may be connected to the user's computer through any kind of network, including a local area network (LAN) or a wide area network (WAN), or may be connected to an external computer (eg, using an Internet service provider via Internet connection).

The flowchart and block diagrams in the Figures illustrate the architecture, functionality, and operation of possible implementations of systems, methods and computer program products according to various embodiments of the present application. In this regard, each block in the flowchart or block diagrams may represent a module, program segment, or portion of code that contains one or more executable instructions for implementing the specified logical functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It is also noted that each block of the block diagrams and/or flowchart, and combinations of blocks in the block diagrams and/or flowchart, can be implemented in dedicated hardware-based systems that perform the specified functions or operations, or can be implemented in a combination of dedicated hardware and computer instructions.

The units involved in the embodiments of the present application may be implemented in a software manner, and may also be implemented in a hardware manner. The described unit may also be provided in the processor, for example, it may be described as: a processor, including an acquisition unit, a generation unit, a correction unit and a sending unit. The names of these units do not constitute a limitation of the unit itself under certain circumstances. For example, the acquisition unit may also be described as a unit acquiring the gradient correlation information corresponding to the target sample and the reference samples belonging to the same batch as the target sample, respectively. The sample set to which the target sample belongs pertains to the two-category sample set with uneven distribution".

The above description is only a preferred embodiment of the present application and an illustration of the applied technical principles. It should be understood by those skilled in the art that the scope of the disclosure involved in the embodiments of the present application is not limited to the technical solution formed by the specific combination of the above technical features, and should also cover, without departing from the above inventive concept, the above Other technical solutions formed by any combination of technical features or their equivalent features. For example, a technical solution is formed by replacing the above features with the technical features disclosed (but not limited to) in the embodiments of the present application with similar functions.

What is claimed is:

1. A data protection method, comprising:
acquiring gradient correlation information respectively corresponding to a target sample and a reference sample belonging to the same batch as the target sample, wherein a sample set to which the target sample belongs pertains to a binary classification sample set that is imbalanced in distribution;
generating information of to-be-added data noise according to a comparison result of the gradient correlation information corresponding to the target sample and the gradient correlation information corresponding to the reference sample;
correcting an initial gradient transfer value corresponding to the target sample according to the information of the to-be-added data noise, to generate corrected gradient transfer information, so as to enable gradient transfer information corresponding to samples belonging to different categories in the sample set to be consistent, wherein the initial gradient transfer value is used for indicating that a trained joint training model is adjusted according to the target sample; and
sending the gradient transfer information to a passive party of the joint training model, so as to enable the passive party to adjust a parameter of the joint training model according to the gradient transfer information.

2. The method according to claim 1, wherein the gradient correlation information comprises a sample label used for characterizing a sample category and a sample prediction probability, wherein the sample prediction probability is used for characterizing a probability that a sample is predicted to be in a preset category label by the joint training model, the preset category label comprises a sample label with a small proportion in the sample set, and the reference sample comprises a sample of which a sample prediction probability meets a preset probability condition and a sample label is consistent with the preset category label; and
generating the information of the to-be-added data noise according to the comparison result of the gradient correlation information corresponding to the target sample and the gradient correlation information corresponding to the reference sample comprises:
generating a standard deviation of to-be-added data noise matched with the target sample according to whether the sample label corresponding to the target sample is consistent with the preset category label.

3. The method according to claim 2, wherein generating the standard deviation of the to-be-added data noise matched with the target sample according to whether the sample label corresponding to the target sample is consistent with the preset category label comprises:
in response to determining that the sample label corresponding to the target sample is inconsistent with the preset category label, generating a first standard deviation as the standard deviation of the to-be-added data noise matched with the target sample, wherein the first standard deviation is in negative correlation with a sample prediction probability corresponding to the target sample.

4. The method according to claim 2, wherein generating the standard deviation of the to-be-added data noise matched with the target sample according to whether the sample label corresponding to the target sample is consistent with the preset category label comprises:
in response to determining that the sample label corresponding to the target sample is consistent with the preset category label and a sample prediction probability corresponding to the target sample is greater than a sample prediction probability of the reference sample, generating a second standard deviation as the standard deviation of the to-be-added data noise matched with the target sample, wherein the second standard deviation is in positive correlation with the sample prediction probability corresponding to the target sample.

5. The method according to claim 2, wherein the reference sample comprises a sample with a minimum sample prediction probability in samples that are in the same batch as the target sample and have sample labels consistent with the preset category label.

6. The method according to claim 3, wherein the reference sample comprises a sample with a minimum sample prediction probability in samples that are in the same batch as the target sample and have sample labels consistent with the preset category label.

7. The method according to claim 4, wherein the reference sample comprises a sample with a minimum sample prediction probability in samples that are in the same batch as the target sample and have sample labels consistent with the preset category label.

8. The method according to claim 1, wherein the gradient correlation information comprises a gradient modulus used for indicating a gradient modulus of a loss function, corresponding to a sample, on a parameter of a model part belonging to the passive party; and
generating the information of the to-be-added data noise according to the comparison result of the gradient correlation information corresponding to the target sample and the gradient correlation information corresponding to the reference sample comprises:
in response to determining that a gradient modulus corresponding to the target sample is smaller than a gradient modulus corresponding to the reference sample, generating a third standard deviation as the standard deviation of the to-be-added data noise matched with the target sample, wherein the third standard deviation is in negative correlation with the gradient modulus corresponding to the target sample.

9. The method according to claim 8, wherein the reference sample comprises a sample with a maximum gradient modulus in the samples in the same batch as the target sample.

10. A server, comprising:
one or more processors;
a storage device storing one or more programs therein;
when the one or more programs are executed by the one or more processors, cause the one or more processors to implement a method comprising:
acquiring gradient correlation information respectively corresponding to a target sample and a reference sample belonging to the same batch as the target sample, wherein a sample set to which the target sample belongs pertains to a binary classification sample set that is imbalanced in distribution;
generating information of to-be-added data noise according to a comparison result of the gradient correlation information corresponding to the target sample and the gradient correlation information corresponding to the reference sample;
correcting an initial gradient transfer value corresponding to the target sample according to the information of the to-be-added data noise, to generate corrected gradient transfer information, so as to enable gradient transfer information corresponding to samples belonging to different categories in the sample set to be consistent, wherein the initial gradient transfer value is used for indicating that a trained joint training model is adjusted according to the target sample; and
sending the gradient transfer information to a passive party of the joint training model, so as to enable the passive party to adjust a parameter of the joint training model according to the gradient transfer information.

11. The server according to claim 10, wherein the gradient correlation information comprises a sample label used for characterizing a sample category and a sample prediction probability, wherein the sample prediction probability is used for characterizing a probability that a sample is predicted to be in a preset category label by the joint training model, the preset category label comprises a sample label with a small proportion in the sample set, and the reference sample comprises a sample of which a sample prediction probability meets a preset probability condition and a sample label is consistent with the preset category label; and
generating the information of the to-be-added data noise according to the comparison result of the gradient correlation information corresponding to the target sample and the gradient correlation information corresponding to the reference sample comprises:
generating a standard deviation of to-be-added data noise matched with the target sample according to whether the sample label corresponding to the target sample is consistent with the preset category label.

12. A non-transitory computer readable medium storing a computer program therein, wherein when the computer program is executed by a processor, cause the processor to implement method comprising:
acquiring gradient correlation information respectively corresponding to a target sample and a reference sample belonging to the same batch as the target sample, wherein a sample set to which the target sample belongs pertains to a binary classification sample set that is imbalanced in distribution;

generating information of to-be-added data noise according to a comparison result of the gradient correlation information corresponding to the target sample and the gradient correlation information corresponding to the reference sample;

correcting an initial gradient transfer value corresponding to the target sample according to the information of the to-be-added data noise, to generate corrected gradient transfer information, so as to enable gradient transfer information corresponding to samples belonging to different categories in the sample set to be consistent, wherein the initial gradient transfer value is used for indicating that a trained joint training model is adjusted according to the target sample; and sending the gradient transfer information to a passive party of the joint training model, so as to enable the passive party to adjust a parameter of the joint training model according to the gradient transfer information.

13. The non-transitory computer readable medium according to claim 12, wherein the gradient correlation information comprises a sample label used for characterizing a sample category and a sample prediction probability, wherein the sample prediction probability is used for characterizing a probability that a sample is predicted to be in a preset category label by the joint training model, the preset category label comprises a sample label with a small proportion in the sample set, and the reference sample comprises a sample of which a sample prediction probability meets a preset probability condition and a sample label is consistent with the preset category label; and generating the information of the to-be-added data noise according to the comparison result of the gradient correlation information corresponding to the target sample and the gradient correlation information corresponding to the reference sample comprises:

generating a standard deviation of to-be-added data noise matched with the target sample according to whether the sample label corresponding to the target sample is consistent with the preset category label.

14. The non-transitory computer readable medium according to claim 13, wherein generating the standard deviation of the to-be-added data noise matched with the target sample according to whether the sample label corresponding to the target sample is consistent with the preset category label comprises:

in response to determining that the sample label corresponding to the target sample is inconsistent with the preset category label, generating a first standard deviation as the standard deviation of the to-be-added data noise matched with the target sample, wherein the first standard deviation is in negative correlation with a sample prediction probability corresponding to the target sample.

15. The non-transitory computer readable medium according to claim 13, wherein generating the standard deviation of the to-be-added data noise matched with the target sample according to whether the sample label corresponding to the target sample is consistent with the preset category label comprises:

in response to determining that the sample label corresponding to the target sample is consistent with the preset category label and a sample prediction probability corresponding to the target sample is greater than a sample prediction probability of the reference sample, generating a second standard deviation as the standard deviation of the to-be-added data noise matched with the target sample, wherein the second standard deviation is in positive correlation with the sample prediction probability corresponding to the target sample.

16. The non-transitory computer readable medium according to claim 13, wherein the reference sample comprises a sample with a minimum sample prediction probability in samples that are in the same batch as the target sample and have sample labels consistent with the preset category label.

17. The non-transitory computer readable medium according to claim 14, wherein the reference sample comprises a sample with a minimum sample prediction probability in samples that are in the same batch as the target sample and have sample labels consistent with the preset category label.

18. The non-transitory computer readable medium according to claim 15, wherein the reference sample comprises a sample with a minimum sample prediction probability in samples that are in the same batch as the target sample and have sample labels consistent with the preset category label.

19. The non-transitory computer readable medium according to claim 12, wherein the gradient correlation information comprises a gradient modulus used for indicating a gradient modulus of a loss function, corresponding to a sample, on a parameter of a model part belonging to the passive party; and generating the information of the to-be-added data noise according to the comparison result of the gradient correlation information corresponding to the target sample and the gradient correlation information corresponding to the reference sample comprises:

in response to determining that a gradient modulus corresponding to the target sample is smaller than a gradient modulus corresponding to the reference sample, generating a third standard deviation as the standard deviation of the to-be-added data noise matched with the target sample, wherein the third standard deviation is in negative correlation with the gradient modulus corresponding to the target sample.

20. The non-transitory computer readable medium according to claim 19, wherein the reference sample comprises a sample with a maximum gradient modulus in the samples in the same batch as the target sample.

* * * * *